(12) United States Patent
Ikeda et al.

(10) Patent No.: US 7,064,169 B2
(45) Date of Patent: *Jun. 20, 2006

(54) POLYESTER RESIN COMPOSITION

(75) Inventors: Tsuyoshi Ikeda, Kanagawa (JP); Takeshi Hirokane, Kanagawa (JP); Shojiro Kuwahara, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 183 days.

This patent is subject to a terminal disclaimer.

(21) Appl. No.: 10/322,485

(22) Filed: Dec. 19, 2002

(65) Prior Publication Data

US 2003/0195303 A1    Oct. 16, 2003

(30) Foreign Application Priority Data

Dec. 21, 2001 (JP) .............................. 2001/389455

(51) Int. Cl.
*C08L 67/02* (2006.01)
*C08G 63/123* (2006.01)

(52) U.S. Cl. ...................... 525/444; 525/448; 528/300; 528/307

(58) Field of Classification Search ................ 525/444, 525/448; 528/300, 307
See application file for complete search history.

(56) References Cited

U.S. PATENT DOCUMENTS

| | | | |
|---|---|---|---|
| 2,945,008 A | 7/1960 | Caldwell et al. | |
| 3,092,597 A | 6/1963 | Leech et al. | |
| 3,287,320 A | 11/1966 | Leech et al. | |
| 3,424,726 A | 1/1969 | Blumenfeld et al. | |
| 3,578,729 A * | 5/1971 | Brinkmann et al. | 525/176 |
| 3,714,291 A | 1/1973 | Rockey | |
| 3,814,786 A * | 6/1974 | Gall et al. | 264/542 |
| 3,860,611 A | 1/1975 | Krespan | |
| 4,004,878 A | 1/1977 | Magosch et al. | |
| 4,946,931 A | 8/1990 | Heller et al. | |
| 6,740,376 B1 * | 5/2004 | Oguro et al. | 428/35.7 |

FOREIGN PATENT DOCUMENTS

| | | |
|---|---|---|
| EP | 0300836 | 1/1989 |
| EP | 1164155 | 12/2001 |
| EP | 1262524 A2 * | 12/2002 |
| FR | 1472861 | 3/1967 |
| JP | 62-230874 | 10/1987 |
| JP | 62-265361 | 11/1987 |
| JP | 2-187424 | 7/1990 |
| JP | 3-130425 | 6/1991 |
| JP | 4-88078 | 3/1992 |
| JP | 4-201431 | 7/1992 |

* cited by examiner

Primary Examiner—Jeffrey B. Robertson
(74) Attorney, Agent, or Firm—Antonelli, Terry, Stout and Kraus, LLP.

(57) ABSTRACT

Polyester resin composition (C) comprises polyester resin (A), which comprises polyester resin (l) comprising a diol unit having a cyclic acetal structure (CA) and a dicarboxylic acid unit having no CA, polyester resin (m) comprising a dicarboxylic acid unit having CA and a diol unit having no CA and/or polyester resin (n) comprising a diol unit having CA and a dicarboxylic acid unit having CA, and polyester resin (B) having no CA. The sum of the fraction of the dicarboxylic acid unit having CA in the entire dicarboxylic acid unit and the fraction of the diol unit having CA in the entire diol unit in composition (C) is 0.05% by mole or greater. The polyester resin compositions are excellent in transparency, melt viscoelasticity, heat resistance and moldability, and exhibit a samll crystallization rate.

19 Claims, No Drawings

POLYESTER RESIN COMPOSITION

BACKGROUND OF THE INVENTION

1. Field of the Invention

The present invention relates to a polyester resin composition which comprises a polyester resin having a cyclic acetal structure and a polyester resin having no cyclic acetal structure, has 0.05% by mole or greater of the sum of the fraction of the dicarboxylic acid unit having a cyclic acetal structure in the entire dicarboxylic acid unit and the fraction of the diol unit having a cyclic acetal structure in the entire diol unit in the polyester resin composition and exhibits excellent transparency, melt viscoelasticity, heat resistance and moldability.

2. Description of the Prior Art

Polyethylene terephthalate (hereinafter, occasionally referred to as PET) is a resin exhibiting an excellent balance between transparency, mechanical properties, solvent resistance, the property to maintain fragrance and the property for recycling and has been used for various applications such as bottles and films. However, PET has drawbacks with respect to crystallization, melt viscoelasticity and heat resistance as shown in the following. With respect to the crystallization rate, when a molded article or a sheet having a great thickness is prepared from PET, the product causes whitening due to crystallization and transparency is decreased. With respect to the melt viscoelasticity, formed articles cannot be prepared from PET by molding due to a small viscoelasticity. With respect to the heat resistance, PET cannot be used for applications requiring a great heat resistance such as materials used for retortable packaging since the glass transition temperature of PET is about 80° C.

For applications requiring small crystallization rate, other polyester resins such as PET modified with 1,4-cyclohexanedimethanol and PET modified with isophthalic acid are used. For applications to formed articles, PET modified with pyromellitic acid or PET modified with glycerol is used. In the field requiring the heat resistance, polyethylene naphthalate and polyarylates are used.

However, PET modified with 1,4-cyclohexanedimethanol, PET modified with isophthalic acid, PET modified with pyromellitic acid and PET modified with glycerol have drawbacks in that controlling the degree of modification is difficult, highly skilled working is necessary for molding to prepare formed articles and the heat resistance is little improve although the crystallization rate and the melt viscoelasticity are improved. Polyethylene naphthalate and polyarylates exhibit about the same crystallization rate and melt viscoelasticity as those of PET although heat resistance is improved. Thus, no polyester resins suitable for applications requiring simultaneous exhibition of a great heat resistance, a small crystallization rate and a great melt viscoelasticity have been known.

On the other hand, as a polyester resin exhibiting a great heat resistance, a polyester resin obtained by modifying PET with 3,9-bis(1,1-dimethyl-2-hydroxyethyl)-2,4,8,10-tetraoxaspiro[5.5]undecane is disclosed in U.S. Pat. No. 2,945,008 and Japanese Patent Application Laid-Open No. 2002-69165. However, in general this resin of the modified PET is great melt viscosity so the modified PET has drawbacks in moldability such as injection molding, sheet molding, etc. although this resin exhibits excellent heat resistance, mechanical properties, transparency, melt viscoelasticity and secondary workability.

SUMMARY OF THE INVENTION

The present invention has an object of providing a polyester resin composition which exhibits excellent transparency, melt viscoelasticity, heat resistance and moldability, a polyester resin composition which simultaneously exhibits small crystallization rate, a great melt viscoelasticity, a great heat resistance and excellent moldability, and an injection-molded article, a sheet, a film and a formed article obtained by using the polyester resins.

As the result of extensive studies by the present inventors to achieve the above object, it was found that a polyester resin composition, which comprised a polyester resin having a cyclic acetal structure and a polyester resin having no cyclic acetal structure and in which a sum of the fraction of a dicarboxylic acid unit having a cyclic acetal structure in the entire dicarboxylic acid unit and the fraction of a diol unit having a cyclic acetal structure in the entire diol unit in the polyester resin composition is 0.05% by mole or greater, exhibited excellent transparency, melt viscoelasticity, heat resistance and moldability. The present invention has been completed based on this knowledge.

The present invention provides:

(1) A polyester resin composition (C) comprising polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure, wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater;

(2) A polyester resin composition described above in (1), which has a concentration of polyester resin (A) in polyester resin composition (C) of 1 to 95% by weight and exhibits excellent moldability;

(3) A polyester resin composition described above in (1), wherein polyester resin (A) is a polyester resin in which a sum of a fraction of the dicarboxylic acid unit having a cyclic acetal structure in an entire dicarboxylic acid unit and a fraction of the diol unit having a cyclic acetal structure in an entire diol unit is 2 to 35% by mole, polyester resin (B) is polyethylene terephthalate, and the polyester resin composition exhibits excellent transparency;

(4) A polyester resin composition described above in (1), wherein a sum of a fraction of the dicarboxylic acid unit having a cyclic acetal structure in an entire dicarboxylic acid unit and a fraction of the diol unit having a cyclic acetal structure in an entire diol unit in polyester resin (A) is 36% by mole or greater, polyester resin (B) is polyethylene terephthalate, a concentration of polyester resin (A) in polyester resin composition (C) is 85 to 95% by weight, and the polyester resin composition exhibits excellent transparency;

(5) A polyester resin composition described above in (1), wherein a concentration of polyester resin (A) in polyester resin composition (C) is 40 to 95% by weight, polyester resin (B) is polybutylene terephthalate, and the polyester resin composition exhibits excellent transparency;

(6) A polyester resin composition described above in (1), wherein a concentration of polyester resin (A) in polyester resin composition (C) is 5 to 95% by weight, polyester resin composition (C) is a polyester resin composition in which a sum of a fraction of the dicarboxylic acid unit having a cyclic acetal structure in an entire dicarboxylic acid unit and a fraction of the diol unit having a cyclic acetal structure in an entire diol unit is 10% by mole or greater, and the polyester resin composition exhibits an excellent foaming property;

(7) A polyester-based injection-molded article which is obtained by using a polyester resin composition described above;

(8) A transparent polyester-based sheet which is obtained by using a polyester resin composition described above in any one of (3), (4) and (5) and has an entire transmittance of 87% or greater when a thickness is 1.6 mm;

(9) A transparent polyester-based sheet which is obtained by using a polyester resin composition described above in any one of (3), (4) and (5) and has a haze value of 1% or smaller when a thickness is 0.2 mm;

(10) A transparent polyester-based film which is obtained by using a polyester resin composition described above in any one of (3), (4) and (5) and has a haze value of 5% or smaller when a thickness is 20 μm; and

(11) A polyester-based formed article using a polyester resin composition described above in (6).

DESCRIPTION OF THE PREFERRED EMBODIMENTS

The present invention will be described in detail in the following.

Polyester resins (l), (m) and (n) constituting polyester resin (A) in polyester resin (C) of the present invention will be described.

As the diol unit having a cyclic acetal structure in polyester resin (l) or (n), diol units derived from compounds represented by general formula (1):

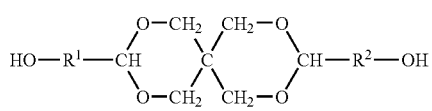

or general formula (2):

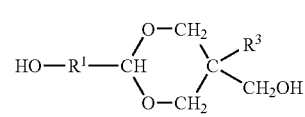

are preferable. In general formulae (1) and (2), $R^1$ and $R^2$ each independently represent a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms. It is preferable that the characteristic group is methylene group, ethylene group, propylene group, butylene group or a group having an isomeric structure of the above group such as isopropylene group and isobutylene group. $R^3$ represents a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms. It is preferable that the characteristic group is methyl group, ethyl group, propyl group, butyl group or a group having an isomeric structure of the above group such as isopropyl group and isobutyl group. It is more preferable that the diol unit having a cyclic acetal structure is a diol unit derived from 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

As the dicarboxylic acid unit having a cyclic acetal structure in polyester resin (m) or (n), dicarboxylic acid units derived from compounds represented by general formula (3):

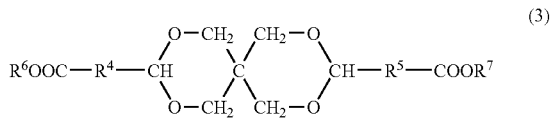

or general formula (4):

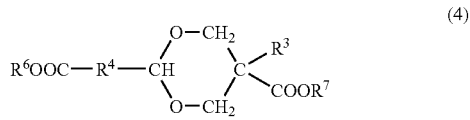

are preferable. In general formulae (3) and (4), $R^3$ is as defined above and $R^4$ and $R^5$ each independently represent a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms. It is preferable that the characteristic group is methylene group, ethylene group, propylene group, butylene group or a group having an isomeric structure of the above group such as isopropylene group and isobutylene group. $R^6$ and $R^7$ each independently represent hydrogen atom, methyl group, ethyl group or isopropyl group and preferably hydrogen atom or methyl group. It is preferable that the dicarboxylic acid unit having a cyclic acetal structure is a dicarboxylic acid unit derived from 3,9-bis(1,1-dimethyl-2-carboxyethyl)-2,4,8,10-tetraoxaspiro[5.5]undecane or 5-carboxy-5-ethyl-2-(1,1-dimethyl-2-carboxyethyl)-1,3-dioxane.

The diol unit and the dicarboxylic acid unit in polyester resins (l) to (n) will be described in the following.

Polyester resin (l) comprises a diol unit comprising 2 to 50% by mole of the diol unit having a cyclic acetal structure and a dicarboxylic acid unit having no cyclic acetal structure. The residual portion of the diol unit comprises a diol unit having no cyclic acetal structure described below.

Polyester resin (m) comprises a dicarboxylic acid unit comprising 2 to 50% by mole of the dicarboxylic acid unit having a cyclic acetal structure and a diol unit having no cyclic acetal structure. The residual portion of the dicarboxylic acid unit comprises a dicarboxylic acid unit having no cyclic acetal structure described below.

Polyester resin (n) comprises a diol unit comprising 1 to 49% by mole of the diol unit having a cyclic acetal structure and a dicarboxylic acid unit comprising 1 to 49% by mole of the dicarboxylic acid unit having a cyclic acetal structure. The residual portions of the diol unit and the dicarboxylic acid unit comprise a diol unit having no cyclic acetal structure described below and a dicarboxylic acid unit having no cyclic acetal structure described below, respectively.

When the fraction of the dicarboxylic acid unit having a cyclic acetal structure or the fraction of the diol unit having a cyclic acetal structure is the lower limit or higher of respective ranges described above, the polyester resin composition of the present invention excellently exhibits a small crystallization rate and a great melt viscoelasticity. And when the above fraction is the upper limit or lower of respective ranges described above, the polyester resin composition of the present invention shows a effective impact strength. The fraction of the dicarboxylic acid unit having a cyclic acetal structure and the fraction of the diol unit having a cyclic acetal structure in the respective units can be suitably selected within the above respective ranges in accordance with the transparency, the heat resistance and the moldability required for the polyester resin composition.

The diol unit having no cyclic acetal structure in polyester resins (l) to (n) is not particularly limited. Examples of the diol unit having no cyclic acetal structure include diol units derived from aliphatic diols such as ethylene glycol, trimethylene glycol, 1,4-butanediol, 1,5-pentanediol, 1,6-hexanediol, diethylene glycol, propylene glycol and neopentyl glycol; polyether compounds such as polyethylene glycol, polypropylene glycol and polybutylene glycol; diols of alicyclic hydrocarbons such as 1,3-cyclohexanedimethanol, 1,4-cyclohexane-dimethanol, 1,2-decahydronaphthalene-dimethanol, 1,3-decahydro-naphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralinedimethanol, norbornene-dimethanol, tricyclodecanedimethanol and pentacyclododecane-dimethanol; bisphenols such as 4,4'-(1-methylethylidene)bisphenol, methylenebisphenol (bisphenol F), 4,4'-cyclohexylidenebisphenol (bisphenol Z) and 4,4'-sulfonylbisphenol (bisphenol S); addition products of alkylene oxides to the above bisphenols; aromatic dihydroxy compounds such as hydroquinone, resorcinol, 4,4'-dihydroxybiphenyl, 4,4'-dihydroxydiphenyl ether and 4,4'-dihydroxy-diphenylbenzophenone; and addition products of alkylene oxides to the above aromatic dihydroxy compounds. From the standpoint of the mechanical properties of polyester resin composition (C) of the present invention, the diol unit derived from ethylene glycol is preferable. The fraction of the ethylene glycol unit in the diol unit of polyester resin (l) is preferably in the range of 20 to 98% by mole, more preferably in the range of 30 to 98% by mole and most preferably in the range of 40 to 98% by mole. The fraction of the ethylene glycol unit in the diol unit of polyester resin (m) is preferably 20% by mole or greater, more preferably 30% by mole or greater and most preferably 40% by mole or greater. The fraction of the ethylene glycol unit in the diol unit of polyester resin (n) is preferably in the range of 20 to 99% by mole, more preferably in the range of 30 to 99% by mole and most preferably in the range of 40 to 99% by mole.

The dicarboxylic acid unit having no cyclic acetal structure in polyester resins (l) to (n) is not particularly limited. Examples of the dicarboxylic acid unit having no cyclic acetal structure include dicarboxylic acid units derived from aliphatic dicarboxylic acids such as succinic acid, glutaric acid, adipic acid, pimellic acid, suberic acid, azelaic acid, sebacic acid, decanedicarboxylic acid, dodecanedicarboxylic acid, cyclohexanedicarboxylic acid, norbornanedicarboxylic acid, tricyclodecane-dicarboxylic acid and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetraline-dicarboxylic acid.

From the standpoint of mechanical properties, dicarboxylic acid units derived from aromatic dicarboxylic acids are preferable and the dicarboxylic acid unit derived from terephthalic acid or 2,6-naphthalenedicarboxylic acid is more preferable among the dicarboxylic acids described above as the examples. It is preferable that the fraction of the aromatic dicarboxylic acid unit in the dicarboxylic acid unit of polyester resin (l) is 70% by mole or greater, more preferably 80% by mole or greater and most preferably 90% by mole or greater. The fraction of the aromatic dicarboxylic acid unit in the dicarboxylic acid unit of polyester resin (m) is preferably in the range of 70 to 98% by mole, more preferably in the range of 80 to 98% by mole and most preferably in the range of 90 to 98% by mole. The fraction of the aromatic dicarboxylic acid unit in the carboxylic acid unit of polyester resin (n) is preferably in the range of 70 to 99% by mole, more preferably in the range of 80 to 99% by mole and most preferably in the range of 90 to 99% by mole. Due to the above fractions in the above ranges, the heat resistance and the mechanical properties of the polyester resin composition of the present invention are more excellently exhibited.

Into polyester resins (l) to (n), units of monoalcohols such as butyl alcohol, hexyl alcohol and octyl alcohol, units of polyhydric alcohols having a functionality of three or greater such as trimethylolpropane, glycerol and pentaerythritol, units of monocarboxylic acids such as benzoic acid, propionic acid and butyric acid and units of polybasic carboxylic acids having a functionality of three or greater such as trimellitic acid, trimesic acid and pyromellitic acid may be introduced as long as the object of the present invention is not adversely affected.

The process for producing polyester resins (l) to (n) is not particularly limited and a conventional process can be applied. Examples of the process include the melt polymerization processes such as the transesterification process and the direct esterification process, the solution polymerization process and the solid polymerization process.

Polyester resin (B) having no cyclic acetal structure is not particularly limited. From the standpoint of the heat resistance, the transparency and the mechanical properties, aromatic polyester resins comprising dicarboxylic acid units derived from at least one aromatic dicarboxylic acid selected from terephthalic acid, isophthalic acid and naphthalenedicarboxylic acid and diol units derived from at least one diol selected from ethylene glycol, 1,4-butanediol, 1,4-cyclohexanedimethanol and bisphenol A are preferable. Polyethylene terephthalate, polybutylene terephthalate and polyethylene naphthalate are more preferable from the standpoint of the moldability and the transparency.

Polyester resin composition (C) of the present invention can be obtained by mixing or kneading polyester resin (A) and polyester resin (B) described above.

The relative amounts of polyester resin (A) and polyester resin (B) can be varied as desired in accordance with the physical properties and the application. The relative amounts are selected in a manner such that the sum of the fraction of the dicarboxylic acid unit having a cyclic acetal structure in the entire dicarboxylic acid unit and the fraction of the diol unit having a cyclic acetal structure in the entire diol unit in polyester resin composition (C) is preferably 0.05% by mole or greater, more preferably 0.1% by mole or greater and most preferably 0.2% by mole or greater. When the above value is 0.05% by mole or greater, the effect of suppressing the rate of crystallization and the secondary workability are excellently exhibited. From the standpoint of the moldability, in general, the above sum of the fractions is preferably 48% by mole or smaller, more preferably 45% by mole or smaller and most preferably 42% by mole or smaller.

A preferable region is present with respect to each of the moldability, the transparency and the property of forming the formed structure. The polyester resin (A) has in general a high melt viscosity, so the injection molding and sheet molding thereof is difficult in many cases.

With respect to the moldability, it is found that the concentration of polyester resin (A) is important, and the polyester resin composition shows suitable melt viscosity and exhibits excellent moldability when the concentration of polyester resin (A) in polyester resin composition (C) is in the range of 1 to 95% by weight and preferably in the range of 1 to 90% by weight. When the concentration of polyester resin (A) is in this range, the melt viscosity at a temperature of 270° C. and a shearing rate of $100~s^{-1}$ is 300 to 700 Pa·s and excellent moldability can be obtained.

With respect to the transparency, the sum of the fraction of the dicarboxylic acid unit having a cyclic acetal structure in the entire carboxylic acid unit and the fraction of the diol unit having a cyclic acetal structure in the entire diol unit in polyester resin (A) and the type of polyester resin (B) are important.

For example, when the polyester resin (A) is a polyester resin in which the sum of the fraction of the dicarboxylic acid unit having a cyclic acetal structure in the entire carboxylic acid unit and the fraction of the diol unit having a cyclic acetal structure in the entire diol unit is in the range of 2 to 35% by mole and polyester resin (B) is polyethylene terephthalate, the polyester resin composition exhibits excellent transparency independently of the of polyester resin (A) in polyester resin composition (C).

When the sum of the fraction of the dicarboxylic acid unit having a cyclic acetal structure in the entire carboxylic acid unit and the fraction of the diol unit having a cyclic acetal structure in the entire diol unit in polyester resin (A) is 36% by mole or greater, the transparency is excellent as long as polyester resin (B) is polyethylene terephthalate and the concentration of polyester resin (A) in polyester resin composition (C) is in the range of 85 to 99% by weight and more preferably in the range of 85 to 95% by weight practically.

When the concentration of polyester resin (A) in polyester resin composition (C) is in the range of 40 to 99% by weight, more preferably in the range of 40 to 95% by weight and most preferably in the range of 50 to 95% by weight, and polyester resin (B) is polybutylene terephthalate, the polyester resin composition exhibits excellent transparency independently of the sum of the fraction of the dicarboxylic acid unit having a cyclic acetal structure in the entire carboxylic acid unit and the fraction of the diol unit having a cyclic acetal structure in the entire diol unit in polyester resin (A).

With respect to the foaming property, it is found that the foaming property depends on the sum of the fraction of the dicarboxylic acid unit having a cyclic acetal structure in the entire carboxylic acid unit and the fraction of the diol unit having a cyclic acetal structure in the entire diol unit in polyester resin (C) and the concentration of polyester resin (A) in polyester resin composition (C). Specifically, the polyester resin composition of the present invention exhibits a great melt strength when the sum of the fraction of the dicarboxylic acid unit having a cyclic acetal structure in the entire carboxylic acid unit and the fraction of the diol unit having a cyclic acetal structure in the entire diol unit in polyester resin (C) is 10% by mole or greater, preferably in the range of 10 to 48% by mole and most preferably in the range of 15 to 48% by mole. A formed article having a great fraction of closed cells can be obtained by expansion molding of the above polyester resin composition. The polyester resin composition of the present invention exhibits a great tensile elongation when the concentration of polyester resin (A) in polyester resin composition (C) is in the range of 5 to 95% by weight, more preferably in the range of 5 to 90% by weight and most preferably in the range of 5 to 85% by weight. A formed article having a great expansion ratio can be obtained by expansion molding of the above polyester resin composition. In particular, a polyester resin composition satisfying both of the above conditions provides excellent fraction of closed cells and expansion ratio during the expansion molding and, thus, exhibits the excellent foaming property.

The polyester resin composition of the present invention may further comprise a solvent and may also comprise a single or a plurality of resins such as aliphatic polyester resins, thermoplastic polyester elastomers, polyolefins, polystyrenes, acrylonitrile-butadiene-styrene copolymers, polymethyl methacrylate, polysulfones, polyethers, phenoxy resins and polyphenylene oxides.

The polyester resin composition of the present invention may further comprise various types of auxiliary agents for molding and additives such as fillers, coloring agents, reinforcing materials, surface-smoothing agents, leveling agents, accelerators for the curing reaction, photostabilizers, ultraviolet absorbers, plasticizers, antioxidants, extenders, delustering agents, agents for adjusting drying, antistatic agents, agents for preventing precipitating, surfactants, agents for improving flow, drying oils, waxes and thermoplastic oligomers.

For the mixing and kneading, a conventional apparatus can be used. Examples of the apparatus for mixing and kneading include a tumbler, a high speed mixer, a nauter mixer, a ribbon type blender, mixing rolls, a kneader, an intensive mixer, a single screw mixer and a twin screw mixer. A liquid mixing apparatus such as a gate mixer, a butterfly mixer, a versatile mixer, a dissolver and a static mixer may also be used.

During the mixing and kneading and, in particular, during melt mixing, occasionally, partial transesterification takes place among the polyesters. The effect of the present invention is not adversely affected by the presence or the absence and the degree of the transesterification. Resin compositions obtained after the transesterification also belong to the polyester resin composition of the present invention. As for the transparency of the polyester resin composition of the present invention, the transparency is occasionally improved when the transesterification proceeds.

The polyester resin composition of the present invention can be used for various applications such as sheets having a single layer or a multilayer, films having a single layer or a multilayer, heat-shrinkable films, hollow containers, formed articles, fibers, coating materials of the solution type, coating of the powder type, toners and adhesives. The polyester resin composition can be advantageously used, in particular, for sheets, films and formed articles due to the following reasons.

In the application to sheets, sheets prepared from crystallizable resins such as polyethylene terephthalate and polybutylene terephthalate exhibit poor transparency. In particular, when thick sheets having a thickness exceeding 2 mm are prepared, the crystallization proceeds occasionally and transparency and impact resistance decrease. Sheets prepared from polyethylene terephthalate and polybutylene terephthalate are poor in secondary workability such as the property for punching and adhesion. On the other hand, sheets prepared from a polyester resin having a cyclic acetal structure such as polyester resin (A) alone have an uneven thickness due to poor workability in molding although the secondary workability is excellent due to small crystallization rate.

In contrast, the polyester resin composition of the present invention which comprises the polyester resin having a cyclic acetal structure and the polyester resin having no cyclic acetal structure exhibits small crystallization rate and excellent workability in molding. Therefore, the transparency is maintained even when a thick sheet such as a sheet having a thickness of 1.6 mm is prepared and a sheet having uniform thickness can be obtained. In particular, the polyester resin composition having a semicrystallization time of 300 seconds or longer and more preferably 350 seconds or longer at 180° C. and a melt viscosity of 300 to 700 Pa·s and more preferably 350 to 700 Pa·s at a shearing rate of 100 s$^{-1}$ can be advantageously used for preparing transparent thick sheets (shown in Examples 22 to 29). Moreover, the excellent secondary workability and heat resistance derived from polyester resin (A) are exhibited. Therefore, polyester-based sheets exhibiting an excellent balance between the transparency, the secondary workability and the heat resistance can be obtained from the polyester resin composition of the present invention and an entire transmittance of 87% or greater, more preferably 88% or greater and most preferably 89% or greater can be achieved. In the case of the thin sheet having a thickness such as 0.2 mm, when a small amount of a polyester resin having a cyclic acetal structure is added to a polyester resin having no cyclic acetal structure, the obtained sheet exhibits a greater transparency than that of sheets prepared from a polyester resin having no cyclic acetal structure or a polyester resin having a cyclic acetal structure and the above obtained sheet has a haze value of 1% or smaller, more preferably 0.9% or smaller and most preferably 0.8% or smaller (shown in Examples 30 to 38). In particular, for applications in which the heat resistance is important, sheets excellent in both of the heat resistance and the transparency can be obtained by using the polyester resin composition in which a sum of the fraction of the dicarboxylic acid unit having a cyclic acetal structure in the entire dicarboxylic acid unit and the fraction of the diol unit having a cyclic acetal structure in the entire diol unit in polyester resin (A) is 36% by mole or greater and a concentration of polyester resin (A) is 85 to 95% by weight.

In the application to films, films of polyethylene terephthalate, polybutylene terephthalate and polyethylene naphthalate have a drawback in that these films have insufficient flexibility and tend to form pin holes. In contrast, the polyester resin composition of the present invention has a suitable degree of flexibility and exhibits a great ability to suppress formation of pin holes. With respect to the transparency, as described above, a film exhibiting excellent transparency can be obtained by suitably selecting the fractions of the dicarboxylic acid unit having a cyclic acetal structure and the diol unit having a cyclic acetal structure in polyester resin (A) and the type of polyester resin (B). For example, the film obtained as described above has a haze value of 5% or smaller when the thickness is 20 μm. In particular, the film using the polyester resin composition of the present invention has a great tensile elongation and exhibits excellent impact strength when the concentration of polyester resin (A) is 5 to 95% by weight (shown in Examples 39 to 46).

In the application to formed articles, conventional aromatic polyester resins such as polyethylene terephthalate and polybutylene terephthalate have small melt strengths and it is difficult that excellent formed articles are obtained. On the other hand, polyester resins having a cyclic acetal structure have a great melt strength and formed articles having a great fraction of closed cells can be obtained. However, in these polyester resin, the greater the melt strength, the smaller the tensile strength and it is difficult to obtain formed articles having a great expansion ratio. In contrast, the polyester resin composition of the present invention exhibits a great melt strength and a great tensile elongation. In particular, the concentration of polyester resin (A) is preferably in the range of 5 to 95% by weight, and the sum of the fraction of the dicarboxylic acid unit having a cyclic acetal structure in the dicarboxylic acid units and the fraction of the diol unit having a cyclic acetal structure in the diol units in polyester resin composition (C) is preferably 10% by mole or greater and more preferably 15% by mole or greater. The polyester resin composition having the above values in the above ranges exhibits a melt strength of 1.5 to 8.0 cN and a tensile elongation of 150 to 400% and an excellent formed article having excellent expansion ratio and content of closed cells can be obtained (shown in Examples 47 to 52).

The resin composition of the present invention can be molded in accordance with a conventional process suitable for each application. For example, molded articles can be prepared in accordance with the conventional injection molding process and sheets and films can be prepared in accordance with the extrusion process, the casting process or the calendering process. Formed articles can be prepared in accordance with the extrusion-expansion process or the expansion-in-mold process.

To summarize the advantages obtained by the invention, the polyester resin composition of the present invention exhibits excellent transparency, melt viscoelasticity, heat resistance and moldability and can be used as a useful material for heat resistant transparent sheets and heat resistant formed articles. Therefore, the polyester resin composition is useful as an industrial material.

EXAMPLES

The present invention will be described more specifically with reference to examples in the following. However, the present invention is not limited to the examples.

Preparation Examples 1 to 11

[Synthesis of Polyester Resins]

Monomers of raw materials shown in Tables 1 to 4 in specific amounts were heated under the atmosphere of nitrogen in the presence of 0.03 moles of manganese acetate tetrahydrate per 100 moles of the dicarboxylic acid component while the temperature was elevated to 200° C. and the transesterification was conducted. When the amounts of water and methanol distilled out reached 90% or greater of the calculated values, 0.01 mole of antimony(III) oxide and 0.06 mole of triphenyl phosphate per 100 moles of the dicarboxylic acid component were added. The polymerization was conducted while the temperature was slowly elevated and the pressure was slowly decreased. Finally, the temperature reached 270° C. and the pressure reached 0.1 kPa or smaller. When the melt viscosity reach a suitable value, the reaction was completed. Polyester resins were obtained in this manner.

The abbreviations in the Tables have the following meanings:
DMT: dimethyl terephthalate
SPD: 3,9-bis(1,1-dimethyl-2-carboxyethyl)-2,4,8,10-tetraoxaspiro-[5.5]undecane
DOD: 5-carboxy-5-ethyl-2-(1,1-dimethyl-2-carboxyethyl)-1,3-dioxane
PMDA: pyromellitic acid
EG: ethylene glycol
SPG: 3,9-bis(1,1-dimethyl-2-hydroxyethyl)-2,4,8,10-tetraoxaspiro-[5.5]undecane
DOG: 5-methylol-5-ethyl-2-(1,1-dimethyl-2-hydroxyethyl)-1,3-dioxane In the Table 6 to 12, cyclic acetal structure means the sum of the fraction of the dicarboxylic acid unit having a cyclic acetal structure and the fraction of the diol unit having a cyclic acetal structure (% by mole).

Reference Examples 1 to 3

[Polyester Resins]

Polyester resins used in Examples and Comparative Examples are shown in the following. The results of evaluation of these polyester resins are shown in Table 4.
(1) PET: polyethylene terephthalate (manufactured by Nippon Unipet Co., Ltd.; the trade name: UNIPET RT543)
(2) PEN: polyethylene naphthalate (manufactured by Toyo Boseki Co., Ltd.; the trade name: PN-510)
(3) PET-G: polyethylene terephthalate modified with 1,4-cyclohexane-dimethanol (manufactured by Eastman Company; the trade name: EASTAR PETG 6763)

[Methods of Evaluation of a Polyester Resin]

(1) Intrinsic Viscosity

The intrinsic viscosity was measured using an Ubbelohde viscometer at a constant temperature of 25° C. in a 6:4 by mass mixed solvent of phenol and 1,1,2,2-tetrachloroethane.

(2) Melt Viscosity

The melt viscosity was measured using Capillograph 1C (a trade name) available from Toyoseiki Seisakusho Co., Ltd. The capillary had a diameter of 1 mm and a length of 10 mm. The measurement was conducted at a temperature of 270° C. and a shearing rate of 100 $sec^{-1}$ after preheating for 3 minutes.

(3) Semicrystallization Time

Measured according to a depolarized light intensity method with a crystallization rate measuring apparatus (MK701, supplied by Kotaki Seisakusho) under the following conditions.
Temperature for melting a sample: 280° C.
Time for melting a sample: 2 minutes
Temperature of a crystallization bath: 180° C.
When the crystallization of the sample was not completed after 5,000 seconds of the measurement, the sample was evaluated as "not crystallizable".

(4) Melt Strength

The melt strength was measured using Capillograph 1C (a trade name, manufactured by Toyoseiki Seisakusho Co., Ltd.). The capillary had a diameter of 1 mm and a length of 10 mm. The measurement was conducted under the condition of a temperature giving the melt viscosity of 1,400 Pa·s, a cross head speed of 10 mm/min and a winding speed of 40 m/min after preheating for 3 minutes.

(5) Glass Transition Temperature

Using a differential thermal calorimeter (manufactured by Shimadzu Seisakusho Co., Ltd.; the type: DSC/TA-50WS), 10 mg of a sample was placed into a container made of aluminum without sealing and the glass transition temperature of a polyester resin was measured under a stream of nitrogen of 30 ml/min while the temperature was elevated at a rate of 20° C./min.

(6) Tensile Elongation

The tensile elongation was measured in accordance with the method of ASTM D638 using a versatile tester (manufactured by Orientec Co., Ltd.; the type: Tensilon UTC-5T).

TABLE 1

| Preparation Example | 1 | 2 | 3 |
|---|---|---|---|
| Polyester resin | | | |
| Monomer | | | |
| dicarboxylic acid component (% by mole) | | | |
| DMT | 100 | 100 | 100 |
| diol component (% by mole) | | | |
| SPG/EG | 25/75 | 2/98 | 45/55 |
| Results of evaluation | | | |
| intrinsic viscosity (dl/g) | 0.73 | 0.71 | 0.75 |
| melt viscosity (Pa · s) | 720 | 510 | 840 |
| semicrystallization time(s) | not crystallizable | 110 | not crystallizable |
| melt strength (cN) | 2.7 | 1.0 | 6.8 |
| glass transition temperature (° C.) | 98 | 84 | 110 |
| tensile elongation (%) | 125 | 280 | 4 |

TABLE 2

| Preparation Example | 4 | 5 | 6 |
|---|---|---|---|
| Polyester resin | | | |
| Monomer | | | |
| dicarboxylic acid component (% by mole) | | | |
| DMT | 100 | 100 | 100 |
| diol component (% by mole) | | | |
| SPG/EG | 31/69 | 6/94 | 20/80 |
| Results of evaluation | | | |
| intrinsic viscosity (dl/g) | 0.69 | 0.65 | 0.71 |
| melt viscosity (Pa · s) | 690 | 580 | 620 |
| semicrystallization time(s) | not crystallizable | 145 | not crystallizable |

TABLE 2-continued

| Preparation Example | 4 | 5 | 6 |
|---|---|---|---|
| melt strength (cN) | 4.5 | 1.2 | 3.1 |
| glass transition temperature (° C.) | 104 | 86 | 96 |
| tensile elongation (%) | 125 | 205 | 170 |

TABLE 3

| Preparation Example | 7 | 8 | 9 |
|---|---|---|---|
| Polyester resin Monomer dicarboxylic acid component (% by mole) | | | |
| DMT | 100 | 100 | — |
| SPD/DMT | — | — | 20/80 |
| diol component (% by mole) | | | |
| DOG/EG | 20/80 | 45/55 | — |
| EG | — | — | 100 |
| Results of evaluation | | | |
| intrinsic viscosity (dl/g) | 0.68 | 0.72 | 0.75 |
| melt viscosity (Pa · s) | 660 | 830 | 690 |
| semicrystallization time(s) | not crystallizable | not crystallizable | not crystallizable |
| melt strength (cN) | 2.0 | 3.0 | 2.5 |
| glass transition temperature (° C.) | 88 | 95 | 87 |
| tensile elongation (%) | 250 | 120 | 80 |

TABLE 4

| Preparation Example | 10 | 11 |
|---|---|---|
| Polyester resin Monomer dicarboxylic acid component (% by mole) | | |
| DOD/DMT | 20/80 | — |
| PMDA/DMT | — | 5/95 |
| diol component (% by mole) | | |
| EG | 100 | 100 |
| Results of evaluation | | |
| intrinsic viscosity (dl/g) | 0.72 | 0.77 |
| melt viscosity (Pa · s) | 640 | 860 |
| semicrystallization time(s) | not crystallizable | 85 |
| melt strength (cN) | 2.9 | 3.1 |
| glass transition temperature (° C.) | 90 | 81 |
| tensile elongation (%) | 110 | 80 |

TABLE 5

| Reference Example | 1 | 2 | 3 |
|---|---|---|---|
| Polyester resin | PET | PEN | PET-G |
| Results of evaluation | | | |
| intrinsic viscosity (dl/g) | 0.75 | 0.67 | 0.75 |
| melt viscosity (Pa · s) | 440 | 630 | 580 |
| semicrystallization time(s) | 53 | 230 | not crystallizable |
| melt strength (cN) | not measurable | 1.1 | 0.9 |
| glass transition temperature (° C.) | 82 | 120 | 83 |
| tensile elongation (%) | 300 | 130 | 240 |

Examples 1 to 21

(Preparation of Polyester Resin Compositions)

Polyester resin (l) or polyester resin (m) shown in Table 6 to 12 was mixed with polyester resin (B) by a tumbler. The resultant mixture of the resins was melt kneaded by a twin screw extruder (the diameter of the screw: 20 mmφ; L/D:25) under the condition of a cylinder temperature of 255 to 290° C., a die temperature of 260 to 280° C. and a rotation speed of the screw of 50 rpm. Polyester resin compositions 1 to 18 were obtained in this manner. The polyester resin compositions were evaluated in accordance with the same methods as those described in Preparation Examples.

TABLE 6

| Example | 1 | 2 | 3 |
|---|---|---|---|
| Polyester resin (A) | Preparation Example 1 | Preparation Example 1 | Preparation Example 1 |
| Polyester resin (B) | PET | PET | PET |
| Concentration of polyester resin (A) (% by weight) | 60 | 5 | 95 |
| Cyclic acetal structure | 15 | 1 | 24 |
| Results of evaluation | | | |
| melt viscosity (Pa · s) | 520 | 440 | 670 |
| semicrystallization time(s) | 2,940 | 190 | not crystallizable |
| melt strength (cN) | 1.8 | 0.3 | 2.6 |
| glass transition temperature (° C.) | 91 | 83 | 97 |
| tensile elongation (%) | 390 | 315 | 195 |

TABLE 7

| Example | 4 | 5 | 6 |
|---|---|---|---|
| Polyester resin (A) | Preparation Example 2 | Preparation Example 3 | Preparation Example 4 |
| Polyester resin (B) | PET | PET | PET |
| Concentration of polyester resin (A) (% by weight) | 50 | 90 | 60 |
| Cyclic acetal structure | 1 | 41 | 27 |
| Results of evaluation | | | |
| melt viscosity (Pa · s) | 410 | 680 | 660 |
| semicrystallization time(s) | 80 | not crystallizable | not crystallizable |
| melt strength (cN) | 0.3 | 6.5 | 4.7 |
| glass transition temperature (° C.) | 83 | 107 | 99 |
| tensile elongation (%) | 320 | 160 | 180 |

TABLE 8

| Example | 7 | 8 | 9 |
|---|---|---|---|
| Polyester resin (A) | Preparation Example 4 | Preparation Example 4 | Preparation Example 5 |
| Polyester resin (B) | PET | PET | PET |
| Concentration of polyester resin (A) (% by weight) | 1 | 67 | 1 |
| Cyclic acetal structure | 0.31 | 20 | 0.06 |
| Results of evaluation | | | |
| melt viscosity (Pa · s) | 470 | 490 | 470 |
| semicrystallization time(s) | 88 | 430 | 78 |
| melt strength (cN) | not measurable | 3.5 | not measurable |

TABLE 8-continued

| Example | 7 | 8 | 9 |
|---|---|---|---|
| glass transition temperature (° C.) | 82 | 95 | 82 |
| tensile elongation (%) | 310 | 180 | 330 |

TABLE 9

| Example | 10 | 11 | 12 |
|---|---|---|---|
| Polyester resin (A) | Preparation Example 5 | Preparation Example 6 | Preparation Example 6 |
| Polyester resin (B) | PET | PET | PET |
| Concentration of polyester resin (A) (% by weight) | 10 | 1 | 10 |
| Cyclic acetal structure | 0.2 | 0.2 | 2 |
| Results of evaluation | | | |
| melt viscosity (Pa · s) | 500 | 6000 | 380 |
| semicrystallization time(s) | 83 | 88 | 96 |
| melt strength (cN) | not measurable | not measurable | 0.7 |
| glass transition temperature (° C.) | 82 | 82 | 83 |
| tensile elongation (%) | 200 | 325 | 255 |

TABLE 10

| Example | 13 | 14 | 15 |
|---|---|---|---|
| Polyester resin (A) | Preparation Example 3 | Preparation Example 4 | Preparation Example 6 |
| Polyester resin (B) | PBT | PBT | PBT |
| Concentration of polyester resin (A) (% by weight) | 90 | 50 | 90 |
| Cyclic acetal structure | 41 | 16 | 18 |
| Results of evaluation | | | |
| melt viscosity (Pa · s) | 600 | 380 | 590 |
| semicrystallization time(s) | 1,870 | 313 | 1,690 |
| melt strength (cN) | 5.5 | 2.5 | 3.6 |
| glass transition temperature | 104 | 75 | 91 |
| tensile elongation (%) | 330 | 285 | 315 |

TABLE 11

| Example | 16 | 17 | 18 |
|---|---|---|---|
| Polyester resin (A) | Preparation Example 1 | Preparation Example 1 | Preparation Example 7 |
| Polyester resin (B) | PEN | PET-G | PET |
| Concentration of polyester resin (A) (% by weight) | 60 | 60 | 60 |
| Cyclic acetal structure | 15 | 15 | 12 |
| Results of evaluation | | | |
| melt viscosity (Pa · s) | 680 | 620 | 520 |
| semicrystallization time(s) | not crystallizable | not crystallizable | 500 |
| melt strength (cN) | 2.0 | 1.5 | 1.6 |
| glass transition temperature (° C.) | 109 | 92 | 85 |
| tensile elongation (%) | 150 | 270 | 400 |

TABLE 12

| Example | 19 | 20 | 21 |
|---|---|---|---|
| Polyester resin (A) | Preparation Example 8 | Preparation Example 9 | Preparation Example 10 |

TABLE 12-continued

| Example | 19 | 20 | 21 |
|---|---|---|---|
| Polyester resin (B) | PET | PET | PET |
| Concentration of polyester resin (A) (% by weight) | 60 | 60 | 60 |
| Cyclic acetal structure | 27 | 12 | 12 |
| Results of evaluation | | | |
| melt viscosity (Pa · s) | 650 | 530 | 500 |
| semicrystallization time(s) | 440 | 320 | 390 |
| melt strength (cN) | 2.5 | 2.0 | 1.7 |
| glass transition temperature (° C.) | 89 | 84 | 86 |
| tensile elongation (%) | 310 | 310 | 320 |

Examples 22 to 29 and Comparative Examples 1 to 6

From polyester resin compositions or polyester resins shown in Tables 13 to 17, sheets having a thickness of 1.6 mm and sheets having a thickness of 0.8 mm were prepared by a twin screw extruder (the diameter of the screw: 20 mmφ; L/D: 25) in accordance with the T-die process under the conditions of a cylinder temperature of 245 to 265° C., a T-die temperature of 240 to 260° C., a rotation speed of the screw of 50 rpm and a cooling roll temperature of 70 to 80° C. Various evaluations were conducted in accordance with the following methods.

[Method of Evaluation of a Sheet]

(1) Moldability

The thickness of a sheet was measured at positions at intervals of 1 cm in the transverse direction and the standard deviation of the obtained values was calculated. The smaller the standard deviation, the better the moldability.

(2) Entire Transmittance

The entire transmittance of a sheet having a thickness of 1.6 mm was measured in accordance with the method of Japanese Industrial Standard K-7105 and ASTM D1003 using an apparatus for measuring the haze value (manufactured by Nippon Denshoku Kogyo Co., Ltd.; the type: COH-300A).

(3) Property for Punching

The punching property of a sheet having a thickness of 1.6 mm was evaluated by using a press (manufactured by Amada Co., Ltd.; the type: torque-back press; the diameter of a hole made by the punching: 19 mmφ; the blade: Thomson blade). The property for punching was evaluated in accordance with the following criterion:

A: completely punched, and no burr on cut surface
B: punchable, but burrs were present on cut surface
C: punching difficult (4) Workability in Adhesion A test piece of a 5 cm square was cut out from a sheet having a thickness of 1.6 mm and adhered under the following condition:

Adhesive: THF, methylene chloride
Time of adhesion: 10 seconds

The workability in adhesion was evaluated in accordance with the following criterion:

A: completely adhered
B: adhered, whitening of the surface
C: poorly adhered, whitening of the surface (5) Heat Resistance A test piece of a 100 mm square was cut out from a sheet having a thickness of 0.8 mm. The extruded direction was set as the longitudinal direction and the direction perpendicular to the extruded direction was set as the transverse direction. The test piece was heated in an oven for 30 minutes and the maximum temperature at which the shrinkages in the longitudinal and transverse directions did not exceed 10% was measured.

TABLE 13

| Example | 22 | 23 | 24 |
|---|---|---|---|
| Polyester resin composition | Example 1 | Example 3 | Example 5 |
| Results of evaluation | | | |
| workability in molding | 2.9 | 3.7 | 4.6 |
| entire transmittance (%) | 91 | 91 | 90 |
| property for punching | A | A | A |
| workability in adhesion | A | A | A |
| heat resistance (° C.) | 85 | 80 | 95 |

TABLE 14

| Example | 25 | 26 | 27 |
|---|---|---|---|
| Polyester resin composition | Example 13 | Example 14 | Example 15 |
| Results of evaluation | | | |
| workability in molding | 3.0 | 1.7 | 2.1 |
| entire transmittance (%) | 91 | 87 | 90 |
| property for punching | A | A | A |
| workability in adhesion | A | A | A |
| heat resistance (° C.) | 100 | 70 | 90 |

TABLE 15

| Example | 28 | 29 |
|---|---|---|
| Polyester resin composition | Example 16 | Example 18 |
| Results of evaluation | | |
| workability in molding | 3.1 | 2.6 |
| entire transmittance (%) | 91 | 90 |
| property for punching | A | A |
| workability in adhesion | A | A |
| heat resistance (° C.) | 105 | 80 |

TABLE 16

| Comparative Example | 1 | 2 | 3 |
|---|---|---|---|
| Polyester resin (composition) | PET | Preparation Example 1 | Preparation Example 3 |
| Results of evaluation | | | |
| workability in molding | 1.8 | 6.7 | 12.8 |
| entire transmittance (%) | 87 | 91 | 91 |
| property for punching | C | A | A |
| workability in adhesion | C | A | A |
| heat resistance (° C.) | 75 | 95 | 105 |

TABLE 17

| Comparative Example | 4 | 5 | 6 |
|---|---|---|---|
| Polyester resin (composition) | PEN | Preparation Example 1 | Preparation Example 6 |

TABLE 17-continued

| Comparative Example | 4 | 5 | 6 |
|---|---|---|---|
| Results of evaluation | | | |
| workability in molding | 2.3 | 12.8 | 4.2 |
| entire transmittance (%) | 88 | 90 | 35 |
| property for punching | C | A | A |
| workability in adhesion | C | A | A |
| heat resistance (° C.) | 115 | 80 | 95 |

Examples 30 to 38 and Comparative Examples 7 to 9

From polyester resin compositions or polyester resins shown in Tables 18 to 21, sheets having a thickness of 0.2 mm were prepared by a twin screw extruder (the diameter of the screw: 20 mmϕ; L/D: 25) in accordance with the T-die process under the conditions of a cylinder temperature of 255 to 275° C., a T-die temperature of 260 to 270° C., a rotation speed of the screw of 50 rpm and a cooling roll temperature of 70 to 80° C. Various evaluations were conducted in accordance with the following methods.

[Method of Evaluation of a Sheet]

(1) Haze Value

The haze value was measured in accordance with the method of Japanese Industrial Standard K-7105 and ASTM D1003. After a sheet having a thickness of 0.2 mm was conditioned with respect to humidity for 48 hours, the measurement was conducted in an atmosphere of a temperature of 23° C. and a relative humidity of 50% using an apparatus for measuring the haze value (manufactured by Nippon Denshoku Kogyo Co., Ltd.: the type: COH-300A).

(2) Impact Strength

The impact strength was obtained by measuring the strength of impact fracture of a sheet having a thickness of 0.2 mm using a film impact tester (manufactured by Orientec Co., Ltd.; the type: IFT-60).

TABLE 18

| Example | 30 | 31 | 32 |
|---|---|---|---|
| Polyester resin composition | Example 7 | Example 8 | Example 9 |
| Results of evaluation | | | |
| haze value (%) | 0.56 | 0.66 | 0.51 |
| impact strength (kg · cm/cm) | 1,150 | 340 | 1,200 |

TABLE 19

| Example | 33 | 34 | 35 |
|---|---|---|---|
| Polyester resin composition | Example 10 | Example 11 | Example 12 |
| Results of evaluation | | | |
| haze value (%) | 0.27 | 0.64 | 0.49 |
| impact strength (kg · cm/cm) | 1,200 | 1,200 | 1,080 |

TABLE 20

| Example | 36 | 37 | 38 |
|---|---|---|---|
| Polyester resin composition | Example 13 | Example 14 | Example 15 |
| Results of evaluation | | | |
| haze value (%) | 0.33 | 0.94 | 0.37 |
| impact strength (kg · cm/cm) | 1,200 | 560 | 1,200 |

TABLE 21

| Comparative Example | 7 | 8 | 9 |
|---|---|---|---|
| Polyester resin (composition) | PET | Preparation Example 4 | Preparation Example 6 |
| Results of evaluation | | | |
| haze value (%) | 4.30 | 1.85 | 3.97 |
| impact strength (kg · cm/cm) | 1,200 | 280 | 960 |

Examples 39 to 46 and Comparative Examples 10 to 12

Polyester resin compositions and polyester resins shown in Tables 22 to 25 were used. The composition or the resin was formed into a sheet by a twin screw extruder (the diameter of the screw: 20 mmϕ; L/D: 25) in accordance with the T-die process under the conditions of a cylinder temperature of 240 to 260° C., a T-die temperature of 280° C., a rotation speed of the screw of 50 rpm and a cooling roll temperature of 70 to 80° C. and an unstretched sheet having a width of 120 mm and a thickness of about 0.3 mm was prepared. After the unstretched sheet obtained above was preheated at 90 to 110° C. for 10 to 30 seconds, the sheet was stretched simultaneously in the longitudinal and transverse directions under the condition of a linear stretching speed of 30 to 90%/second and a stretching ratio of 4.0 in both longitudinal and transverse directions using a biaxial stretching machine manufactured by Toyo Seiki Seisakusho Co., Ltd. In Examples 40 and 41 and Comparative Example 10, the stretched film was treated by heating in an atmosphere of 235 to 240° C. for 20 seconds while the film was kept in the stretched condition. Stretched films having a thickness of 20 μm were obtained in this manner. Various evaluations were conducted in accordance with the following methods.

[Methods of Evaluation of a Film]

(1) Haze Value

The haze value was measured in accordance with the method of Japanese Industrial Standard K-7105 and ASTM D1003. After a film having a thickness of 20 μm was conditioned with respect to humidity for 48 hours, the measurement was conducted in an atmosphere of a temperature of 23° C. and a relative humidity of 50% using an apparatus for measuring the haze value (manufactured by Nippon Denshoku Kogyo Co., Ltd.: the type: COH300A).

(2) Impact Punching Test

The impact punching test was conducted in accordance with the method of Japanese Industrial Standard P813 and ASTM D781. The condition of the measurement was a temperature of 23° C. and a relative humidity of 50%. The unit of the measured value is kJ/m.

(3) Resistance to Formation of Pin Holes

As the apparatus for the measurement, Gelboflex tester manufactured by Rigaku Kogyo Co., Ltd. was used. In the measurement, the axial direction of, Gelboflex was used as the direction of the measurement. Formed pin holes were measured by using a pin hole tester (a method of discharging a weak electric current). The measurement was conducted in the environment of a temperature of 23° C. and a relative humidity of 50%.

TABLE 22

| Example | 39 | 40 | 41 |
|---|---|---|---|
| Polyester resin composition | Example 1 | Example 2 | Example 4 |
| Results of evaluation | | | |
| impact punching strength | 51 | 46 | 44 |
| haze value (%) | 0.3 | 0.2 | 0.2 |
| resistance to formation of pin holes | | | |
| number of pin holes/200 times | 0.0 | 0.0 | 0.0 |
| number of pin holes/400 times | 0.0 | 0.0 | 0.0 |
| number of pin holes/600 times | 1.0 | 1.2 | 0.9 |

TABLE 23

| Example | 42 | 43 | 44 |
|---|---|---|---|
| Polyester resin composition | Example 13 | Example 14 | Example 15 |
| Results of evaluation | | | |
| impact punching strength | 42 | 55 | 43 |
| haze value (%) | 0.4 | 2.1 | 0.6 |
| resistance to formation of pin holes | | | |
| number of pin holes/200 times | 0.0 | 0.0 | 0.0 |
| number of pin holes/400 times | 0.0 | 0.2 | 0.0 |
| number of pin holes/600 times | 0.0 | 3.3 | 0.1 |

TABLE 24

| Example | 45 | 46 |
|---|---|---|
| Polyester resin composition | Example 5 | Example 20 |
| Results of evaluation | | |
| impact punching strength | 49 | 46 |
| haze value (%) | 0.5 | 0.2 |
| resistance to formation of pin holes | | |
| number of pin holes/200 times | 0.0 | 0.0 |
| number of pin holes/400 times | 0.0 | 0.0 |
| number of pin holes/600 times | 0.3 | 1.1 |

TABLE 25

| Comparative Example | 10 | 11 | 12 |
|---|---|---|---|
| Polyester resin (composition) | PET | Preparation Example 1 | Preparation Example 17 |
| Results of evaluation | | | |
| impact punching strength | 29 | 37 | 48 |
| haze value (%) | 0.1 | 0.5 | 19.5 |
| resistance to formation of pin holes | | | |
| number of pin holes/200 times | 0.3 | 0.0 | 0.0 |
| number of pin holes/400 times | 5.3 | 0.0 | 0.0 |
| number of pin holes/600 times | 12.7 | 0.0 | 0.2 |

Examples 47 to 52 and Comparative Examples 13 to 18

To 100 parts by mass of a polyester resin composition or a polyester resin shown in Tables 22 to 25, 1.5 parts by mass of talc was added as the nucleating agent. The resultant mixture was used as the raw material resin and supplied into the first extruder (for melt mixing). After the raw material resin was heated, melted and mixed, 1.7 parts by mass of isobutane as the foaming agent per 100 parts by mass of the polyester resin was added into the extruder under a pressure and mixed together under melting. The mixture obtained by the mixing under melting was supplied to the second extruder and extruded from a die having a ring shape at the tip of the extruder and a tubular formed product was obtained. The tubular formed product was pulled out while the inner surface was cooled by bringing into contact with a mandrel (a cooling drum having a cylindrical shape) and the outer surface was cooled by blowing with the air. The cooled product was cut along the direction of the extrusion and a formed sheet was obtained. Various evaluations were conducted in accordance with the following methods.

[Methods of Evaluation of a Formed Article]

(1) Expansion Ratio

The expansion ratio of a formed sheet was measured by obtaining the density (d1) of the sheet from the volume measured in accordance with the method of dipping into water, followed by calculating the ratio (d2/d1) of the obtained density (d2) to the density of the raw material resin before the expansion.

(2) Fraction of Closed Cells

The fraction of closed cells in a formed sheet was obtained as follows. Samples having a length of 25 mm and a width of 25 mm, the thickness being unchanged, were cut out from the formed sheet. A plurality of samples were laid in piles in a number such that the combined thickness was closest to 25 mm and the combined samples were placed in a sample cup and used for the measurement. A true volume Vx of the formed sheets (the plurality of the cut samples) was measured by a specific gravity meter of the air comparison type (manufactured by Toshiba Beckman Co., Ltd.; the type: 930) in accordance with the procedure C described in ASTM D2856-70. Using the obtained value, the fraction of closed cells S(%) was calculated in accordance with the following equation:

$$S(\%)=[(Vx-W/\rho)\times 100]/(Va-W/\rho)$$

wherein

Vx: the true volume ($cm^3$) of the plurality of sheets obtained as described above, which corresponds to the sum of the volume of the resin constituting the formed sheets and the entire volume of the portion of closed cells in the formed sheets;

Va: the apparent volume ($cm^3$) of the cut samples calculated from the outer dimensions of the cut samples used for the measurement;

W: the total weight (g) of the cut samples used for the measurement; and

ρ: the density ($g/cm^3$) of the resin constituting the formed sheets.

The above procedures were conducted three times (N=3) and the average of the values obtained by the three measurements was used as the fraction of closed cells.

(3) Property for Heat Molding

Using a mold having a shape of a bowl whose opening had a diameter of 160 mm and a depth of 35 mm, a formed sheet was heat molded by a single molding machine.

The property for heat molding was evaluated in accordance with the following criterion:

good: excellently shaped, no formation of cracks on the surface or fracture fair: slightly poorly shaped, some formation of cracks poor: no stretching of the material sheet, poorly shaped (4) Heat Resistance A test piece of a 100 mm square was cut out from a formed sheet. The extruded direction was set as the longitudinal direction and the direction perpendicular to the extruded direction was set as the transverse direction. The test piece was heated in an oven for 30 minutes and the maximum temperature at which the shrinkages in the longitudinal and transverse directions did not exceed 10% was measured.

TABLE 26

| Example | 47 | 48 | 49 |
| --- | --- | --- | --- |
| Polyester resin composition | Example 1 | Example 5 | Example 6 |
| Results of evaluation | | | |
| expansion ratio | 7.3 | 8.8 | 6.5 |
| fraction of closed cells (%) | 94 | 92 | 90 |
| property for heat molding | good | good | good |
| heat resistance (° C.) | 80 | 100 | 95 |

TABLE 27

| Example | 50 | 51 | 52 |
| --- | --- | --- | --- |
| Polyester resin composition | Example 14 | Example 16 | Example 18 |
| Results of evaluation | | | |
| expansion ratio | 7.5 | 7.1 | 6.0 |
| fraction of closed cells (%) | 89 | 91 | 88 |
| property for heat molding | good | good | good |
| heat resistance (° C.) | 80 | 80 | 75 |

TABLE 28

| Comparative Example | 13 | 14 | 15 |
| --- | --- | --- | --- |
| Polyester resin | PET | Preparation Example 3 | PEN |
| Results of evaluation | | | |
| expansion ratio | no foaming | 3.7 | 2.3 |
| fraction of closed cells (%) | — | 94 | 44 |
| property for heat molding | — | good | poor |
| heat resistance (° C.) | — | 100 | 110 |

TABLE 29

| Comparative Example | 16 | 17 | 18 |
| --- | --- | --- | --- |
| Polyester resin (composition) | PET-G | Preparation Example 11 | Example 2 |
| Results of evaluation | | | |
| expansion ratio | 2.0 | difficult to prepare a sheet | 2.2 |
| fraction of closed cells (%) | 31 | — | 66 |
| property for heat molding | good | — | good |
| heat resistance (° C.) | 70 | — | 70 |

What is claimed is:

1. A polyester resin composition (C) consisting essentially of polyester resin (A), which comprises at least one of polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure, wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and wherein the dicarboxylic acid unit having a cyclic acetal structure in polyester resin (A) is a dicarboxylic acid unit derived from a dicarboxylic acid represented by general formula (3):

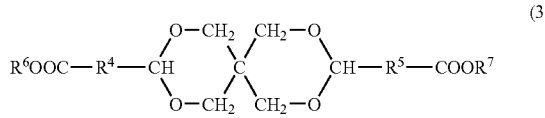

wherein $R^4$ and $R^5$ each independently represent a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms and $R^6$ and $R^7$ each independently represent hydrogen atom, methyl group, ethyl group, or isopropyl group, or a dicarboxylic acid represented by generat formula (4):

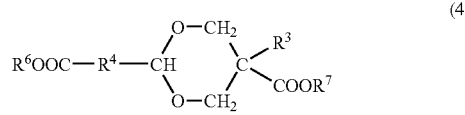

wherein $R^3$ represents a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms, and $R^4$, $R^6$ and $R^7$ are as defined above.

2. A polyester resin composition according to claim 1, wherein the diol unit having a cyclic acetal structure in polyester resin (A) is a diol unit derived from a diol represented by general formula (1):

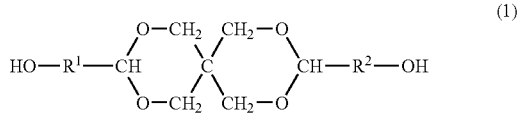

wherein $R^1$ and $R^2$ each independently represent a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms, or a diol represented by general formula (2):

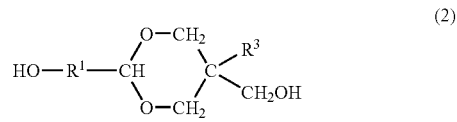

wherein $R^1$ is as defined above and $R^3$ represents a characteristic group selected from a group consisting of acyclic hydrocarbon groups having 1 to 10 carbon atoms, alicyclic hydrocarbon groups having 3 to 10 carbon atoms and aromatic hydrocarbon groups having 6 to 10 carbon atoms.

3. A polyester resin composition according to claim 1, wherein the dicarboxylic acid unit having a cyclic acetal structure is a dicarboxylic acid unit derived from 3,9-bis(1,1-dimethyl-2-carboxyethyl)-2,4,8,10-tetraoxaspiro[5.5]undecane or 5-carboxy-5-ethyl-2-(1,1-dimethyl-2-carboxyethyl)-1,3-dioxane.

4. A polyester resin composition according to claim 1, wherein polyester resin (A) is polyester resin (l) which comprises a dicarboxylic acid unit comprising 70% by mole or more of an aromatic dicarboxylic acid unit, a diol unit comprising 2 to 50% by mole of a diol unit having a cyclic acetal structure and 20 to 98% by mole of an ethylene glycol unit.

5. A polyester resin composition according to claim 4, wherein the aromatic dicarboxylic acid unit is a dicarboxylic acid unit derived from terephthalic acid or 2,6-naphthalenedicarboxylic acid.

6. A polyester resin composition according to claim 1, wherein polyester resin (B) is an aromatic polyester resin which comprises a dicarboxylic acid unit derived from at least one aromatic carboxylic acid selected from terephthalic acid, isophthalic acid and naphthalenedicarboxylic acid and a diol unit derived from at least one diol selected from ethylene glycol, 1,4-butanediol, 1,4-cyclohexanedimethanol and bisphenol A.

7. A polyester resin composition according to claim 1, which has a concentration of polyester resin (A) in polyester resin composition (C) of 1 to 95% by weight.

8. A polyester resin composition according to claim 6, wherein polyester resin (B) is polybutylene terephthalate.

9. A polyester resin composition according to claim 1, which is made into an injection-molded article.

10. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure, wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and wherein the diol unit having a cyclic acetal structure is a diol unit derived from 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

11. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure,
  wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and
  wherein said polyester resin (B) is polyethylene terephthalate.

12. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure,
  wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and
  wherein a sum of a fraction of the dicarboxylic acid unit having a cyclic acetal structure in an entire dicarboxylic acid unit and a fraction of the diol unit having a cyclic acetal structure in an entire diol unit in polyester resin (A) is 2 to 35% by mole, polyester resin (B) is polyethylene terephthalate.

13. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure,
  wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and
  wherein polyester resin (A) is a polyester resin in which a sum of a fraction of the dicarboxylic acid unit having a cyclic acetal structure in an entire dicarboxylic acid unit and a fraction of the diol unit having a cyclic acetal structure in an entire diol unit is 36% by mole or greater, polyester resin (B) is polyethylene terephthalate, a concentration of polyester resin (A) in polyester resin composition (C) is 85 to 95% by weight.

14. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure,
  wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and
  wherein a concentration of polyester resin (A) in polyester resin composition (C) is 5 to 95% by weight, polyester resin composition (C) is a polyester resin composition in which a sum of a fraction of the dicarboxylic acid unit having a cyclic acetal structure in an entire dicarboxylic acid unit and a fraction of the diol unit having a cyclic acetal structure in an entire diol unit is 10% by mole or greater.

15. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure,
  wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, and
  wherein a concentration of polyester resin (A) in polyester resin composition (C) is 40 to 95% by weight, polyester resin (B) is polybutylene terephthalate.

16. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure, wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, the polyester resin composition (C) being made into a transparent sheet having entire transmittance of 87% or greater when a thickness is 1.6 mm.

17. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure, wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mote or greater, the polyester resin composition (C) being made into a transparent sheet having a haze value of 1% or smaller when a thickness is 0.2 mm.

18. A polyester resin composition (C) consisting essentially of polyester resin (A), which comprises at least one of polyester resin (l) comprising a diol unit comprising 2 to 50% by mole of a diol unit having a cyclic acetal structure and a dicarboxylic acid unit having no cyclic acetal structure, polyester resin (m) comprising a dicarboxylic acid unit comprising 2 to 50% by mole of a dicarboxylic acid unit having a cyclic acetal structure and a diol unit having no cyclic acetal structure and polyester resin (n) comprising a diol unit comprising 1 to 49% by mole of a diol unit having a cyclic acetal structure and a dicarboxylic acid unit comprising 1 to 49% by mole of a dicarboxylic acid unit having a cyclic acetal structure, and polyester resin (B) having no cyclic acetal structure, wherein a sum of a fraction of the dicarboxylic acid unit having a cyclic acetal structure in an entire dicarboxylic acid unit and a fraction of the diol unit having a cyclic acetal structure in an entire diol unit in polyester resin composition (C) is 0.05% by mole or greater, the polyester resin composition (C) being made into a film having a haze value of 5% or smaller when a thickness is 20 μm.

19. A polyester resin composition according to claim 14, which is made into a foamed article.

* * * * *